Patented July 18, 1933

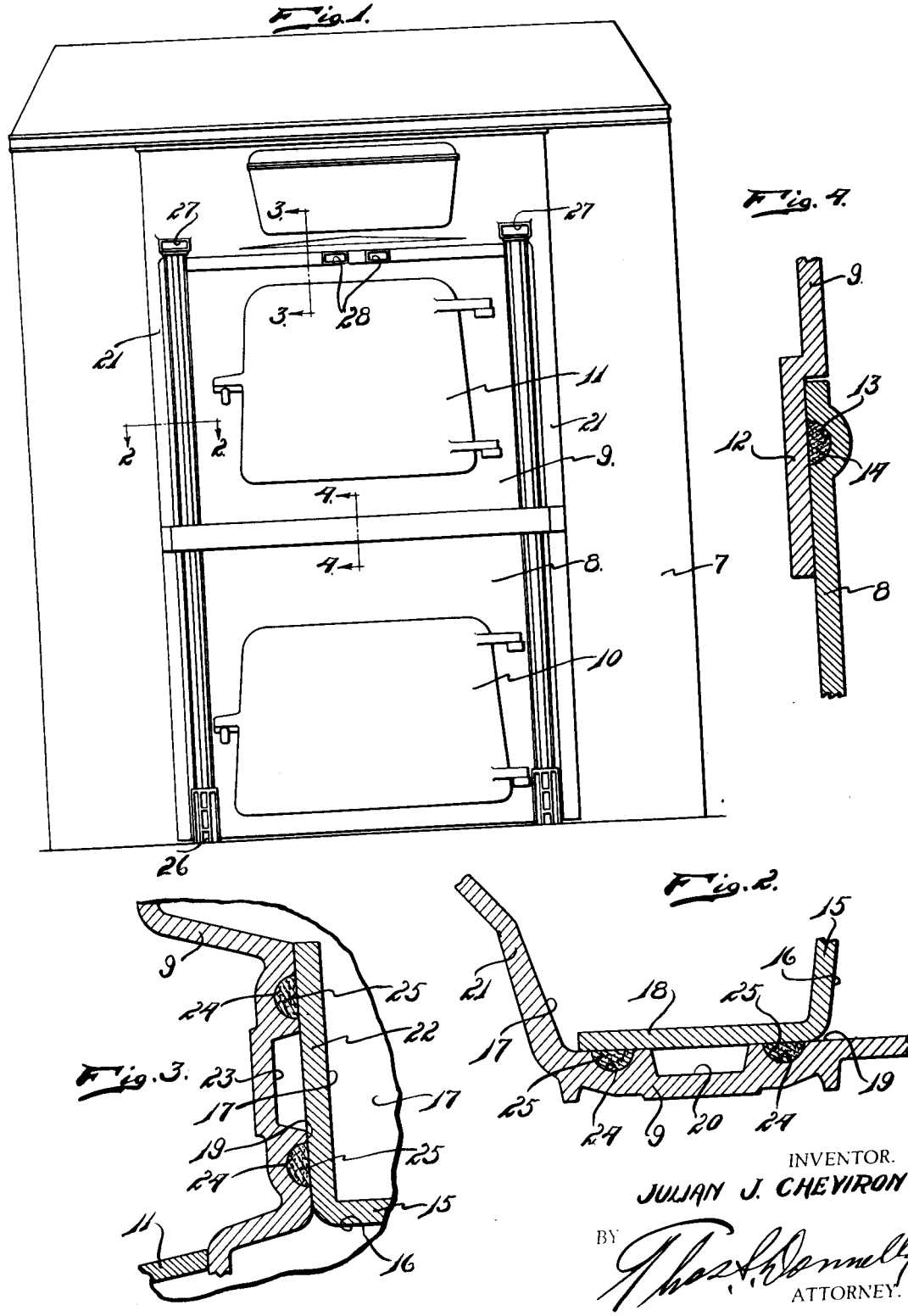

1,919,008

UNITED STATES PATENT OFFICE

JULIAN J. CHEVIRON, OF DETROIT, MICHIGAN

HOT AIR FURNACE CONSTRUCTION

Application filed March 31, 1932. Serial No. 602,293.

My invention relates to a new and useful improvement in a hot air furnace construction, and has for its object the provision of a construction whereby the leakage of gases from the fire box or combustion chamber is prevented.

Another object of the invention is the provision in a hot air furnace construction of a structure whereby conduits or channels are provided for the reception of such gases as may escape from the fire box or combustion chamber and which will serve to conduct the escaping gases away from the hot air chamber.

Another object of the invention is the provision of a sealing structure spaced by a channel or conduit so that the escape of gases from the fire box or combustion chamber is prevented and so that should any of the gases escape through one of the sealing members, the conduit or channel will serve as a conduit to conduct the escaping gases away so as to prevent their passage across the additional seal.

Other objects will appear hereinafter.

The invention consists in the combination and arrangement of parts hereinafter described and claimed.

The invention will be best understood by a reference to the accompanying drawing which forms a part of this specification, and in which, Fig. 1 is a front elevational view of the invention.

Fig. 2 is a fragmentary, sectional view taken on line 2—2 of Fig. 1.

Fig. 3 is a fragmentary sectional view taken on line 3—3 of Fig. 1.

Fig. 4 is a fragmentary sectional view taken on line 4—4 of Fig. 1.

The invention is designed for use on a hot air furnace construction having an outer casing 7 and provided with a front having the upper and lower sections 8 and 9 in which are mounted the doors 10 and 11 respectively to permit access to the ash pit and fire box and combustion chamber. The section 9 overlies as at 12 the section 8 in which is formed on its inner face a channel 13 in which is positioned a suitable layer of packing or sealing material 14. Positioned within the furnace is an inner shell 15 which serves to enclose the combustion chamber 16 and separate the same from the hot air chamber 17. This inner shell 15 is provided along its sides with a flange 18 which engages against the face 19 of the front, and in which is formed at opposite sides a vertically extending channel 20. The front is provided with the flange 21 which is connected in any suitable manner to the casing 7. At the top of the shell 15 there is provided a flange 22 which engages the inner face 19 of the plate section 9 in which is formed the horizontally disposed channel 23 communicating at its opposite ends with the channels 20. Positioned in recesses or grooves 24 at opposite sides of the channels 20 and 23 is a packing 25 so that the escape of gases from the chamber 16 into the chamber 17 through the space between the flange 18 and the front plate or the flange 22 and the front plate is prevented. The positioning of the channels 20, however, between these sealing members 25 serves to provide a conduit for the reception of such gases as may escape. Openings 26 are formed in the lower ends of each of the conduits 20 and openings 27 are formed in the upper ends thereof. Openings 28 are formed in the channel 23.

The construction is such that any gases which escape into these channels 20 will travel upwardly and escape through the openings 27 or through the openings 28. The gases escape into the channel 23 and also escape into the openings 28.

By this type of construction there is provided a seal which serves to prevent the passage of the gases from the combustion chamber or fire box into the hot air chamber and there is also provided a double space seal with a conducting conduit between so that the passage of gases past both of the seals is practically prevented in all cases. In this manner I have provided a superior type of construction in which the delivery of the gases of combustion into the hot air chamber is entirely eliminated.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. A hot air furnace of the class described comprising: a casing, a shell positioned within said casing; a separate front mounted on said casing, said front engaging and being secured to said shell; a plurality of spaced sealing means for sealing the escape of gases from within said shell into the interior of said casing at the place of engagement of said shell with said plate; and a conduit between said sealing means for the reception of gases escaping past one of said sealing means.

2. In a hot air furnace construction of the class described: an outer casing; a front mounted on said casing; an inner shell within said casing and attached to said front; and gas conducting conduits on said front for the reception of gases escaping from within said shell.

3. In a hot air furnace construction of the class described: an outer casing; a front mounted on said casing; a shell positioned within said casing and secured to said front; sealing means for preventing the escape of gases from within said shell into the interior of said casing at the engagement of said shell with said front; and gas conducting conduits carried by said front for the reception of gases escaping from said shell.

4. In a hot air furnace construction of the class described: an outer casing; a front mounted on said casing; an inner shell positioned within said casing and engaging and attached to said front; sealing means for preventing escape of gases from within said shell into the interior of said casing at the portions engaged by said front; and gas conducting conduits positioned in the path of gases escaping from said shell for the reception of the same and for conducting them to the exterior of said casing.

5. In a furnace construction of the class described: an outer casing; a front mounted on said casing; an inner shell positioned within said casing; an outwardly projecting flange on said shell for engaging said front and attaching said shell thereto; a plurality of spaced sealing members for sealing the passage of gases from within said shell outwardly between said flange and said front; and a gas conducting conduit positioned between said sealing members for reception of gases escaping from within said shell.

6. In a furnace construction of the class described: an outer casing; a front mounted on said casing; an inner shell positioned within said casing; an outwardly projecting flange on said shell for engaging said front and attaching said shell thereto; a plurality of spaced sealing members for sealing the passage of gases from within said shell outwardly between said flange and said front; a gas conducting conduit positioned between said sealing members for reception of gases escaping from within said shell, said conduit having openings opening exteriorly of said casing.

JULIAN J. CHEVIRON.